United States Patent [19]

Kuehn, Jr. et al.

[11] 4,143,280
[45] Mar. 6, 1979

[54] CONTROL SYSTEM FOR A TERTIARY WINDING SELF-EXCITED GENERATOR

[75] Inventors: Frederick J. Kuehn, Jr.; Joseph A. Laukaitis; Stuart W. McElhenny, all of Erie, Pa.

[73] Assignee: General Electric Company, Erie, Pa.

[21] Appl. No.: 811,921

[22] Filed: Jul. 1, 1977

[51] Int. Cl.² .............................................. B60L 11/06
[52] U.S. Cl. ......................................... 290/9; 322/88; 318/147; 290/14
[58] Field of Search ..................................... 322/86–88; 318/144, 145, 147, 148; 290/8, 9, 14, 17, 50, 52

[56] References Cited

U.S. PATENT DOCUMENTS

| 2,157,830 | 5/1939 | McLenegan | 318/147 |
| 3,518,529 | 6/1970 | Pratt | 522/88 |
| 3,524,069 | 8/1970 | Stepanov et al. | 318/147 |

Primary Examiner—Robert K. Schaefer
Assistant Examiner—John W. Redman
Attorney, Agent, or Firm—James H. Beusse

[57] ABSTRACT

A control system for a self-excited alternator which includes an auxiliary winding adapted to supply excitation to the alternator field winding incorporates a circuit for supplementing field excitation when the available energy from the auxiliary winding is less than the desired magnitude of field excitation. The self-exciting a-c current from the auxiliary winding is coupled through a phase-controlled rectifier circuit to the alternator field winding. A secondary excitation source such as a battery is coupled to the alternator field winding through a chopper circuit. A regulating circuit is responsive to a field current reference signal for controlling the conduction of the phase controlled rectifier circuit and the chopper circuit in a manner to regulate the alternator field excitation to the desired value. The regulating circuit is adapted to supplement the excitation supplied by the auxiliary winding with excitation from the secondary source until the excitation available from the auxiliary winding is sufficient to supply the desired magnitude of alternator field excitation.

9 Claims, 3 Drawing Figures 4,143,280

CONTROL SYSTEM FOR A TERTIARY WINDING SELF-EXCITED GENERATOR

BACKGROUND OF THE INVENTION

This invention relates to apparatus for exciting and regulating rotating alternating current generators and, more particularly, to a static control system for a self-excited variable speed generator.

Alternating current (a-c) generators or alternators are electrical machines having relatively rotatable magnetic core members forming a magnetic circuit. A field winding is commonly provided on one of the core members and a main or armature winding which developed the alternating current produced by the alternator is formed on another core member. Direct current (d-c) is supplied to the field winding to establish magnetic poles within the alternator. Within its normal operating range the magnitude of alternating current produced by the alternator is directly related to the relative rotational velocity between the armature and field winding and the magnitude of current in the field windings. Once the alternator is in operation a portion of the alternating current from the main winding can be rectified and used to provide excitation to the field winding. Alternators employing such techniques are well known and are referred to as self-excited machines.

The present invention is of particular utility in an electric propulsion system for traction vehicles such as, for example, off-highway vehicles of the earthmoving or mining type. Such a vehicle may include an articulated frame and a four-wheel drive. Both front and rear axles may be driven by an electrical system comprising a pair of variable speed reversible d-c motors which are energized by an alternator coupled to a diesel engine or other suitable prime mover. By appropriate manipulation of a speed control pedal, an operator can control the electric drive system so as to determine the vehicle speed. The speed control pedal acts as a throttle control to vary the speed of the diesel engine driving the generator and thus varies the electrical power output of the a-c generator.

A typical a-c generator for a traction vehicle may provide 750 amperes a-c RMS current at 1600 volts RMS and may require 300 amperes of d-c current excitation for its field winding. In such an application it is possible to siphon off a portion of the alternating current developed by the main winding in order to provide a relatively low voltage excitation to the field windings. However, if the alternator is started under substantially short circuit load conditions, such as in electric traction motor applications, the short circuit condition will prevent the main winding voltage from attaining a magnitude sufficient to allow the alternator to operate in a self-excited mode. A more practical method for implementing self-excitation is to provide an auxiliary or tertiary winding on the armature which produces an alternating current suitable for exciting the field winding after appropriate rectification. Such a system is shown in Canadian Pat. No. 812,936 issued May 13, 1969. In this patent the alternator is stationary and adapted to operate with a substantially constant relative rotational velocity and the alternating current output is regulated by control of the direct current excitation of the field winding. During initial start-up of the alternator, the field winding is excited by a battery which provides sufficient excitation under no-load conditions to cause current to be generated in the auxiliary winding without appreciably discharging the battery.

In a system in which the generator is operated over a range of rotational velocities and the alternating current produced by the generator is a function of the relative rotational velocity between the core members, it will be appreciated that at low speeds the energy produced by the auxiliary winding may be insufficient to provide field current at the desired level. Accordingly, at such low speeds the battery necessarily supplies at least part of the excitation for the field winding. If the generator is operated any appreciable percentage of time at low speeds, it will be apparent that the battery may become weakened and unable to supply adequate field excitation.

Although discharge of the battery may be avoided by drawing power at low armature velocities from a battery charger circuit such as a rotating exciter, this alternative does not provide a ready means of regulating the average magnitude of alternator field current. If the field current is allowed to stabilize at its own level, i.e., if the current is determined solely by the magnitude of available battery voltage, the power output of the alternator may exceed a desired level. Furthermore, if the battery circuit is continuously required to supply field excitation, the physical capability and size of the battery circuit becomes economically impractical, particularly in traction vehicle applications where equipment space is limited. Thus, it will be appreciated that the level of excitation supplied by the battery or other means should be regulated to prevent overexciting the alternator field winding and to blend the excitation energy withdrawn from the battery circuit with the excitation from the auxiliary winding in a manner to minimize the use of battery supplied excitation current.

OBJECT OF THE INVENTION

It is an object of the present invention to provide an improved method and apparatus for augmenting self-excitation of an alternator field winding.

It is a further object of the present invention to provide a method and apparatus for controlling a secondary excitation source in a self-excited alternator circuit to minimize power drain of the secondary source.

SUMMARY OF THE INVENTION

In accordance with the present invention there is provided a control system for a self-excited alternator which blends secondary excitation with self-excitation in a manner to minimize secondary source power. The alternator is preferably of the type having an armature mounted auxiliary or tertiary winding for producing excitation current for a field winding of the alternator. A secondary source is connected in circuit with the auxiliary winding in order to supply field winding excitation when the excitation current available from the auxiliary winding is less than the desired magnitude. The inventive system includes a first control means, such as a phase-controlled rectifier, connected in circuit with the auxiliary winding and the field winding for controlling the average magnitude of excitation current supplied from the auxiliary winding to the field winding. A secondary excitation source and a second control means, such as a chopper, is also connected in circuit with the auxiliary winding. A regulating circuit is responsive to selected parameters of the generator to provide signals to control both the first and second control means. The regulating circuit utilizes a first feed forward loop for supplying control signals to the first control means and a second feed forward loop for supplying control signals to the second control means. The amplification factor of the first loop is chosen to be greater than that of the second loop whereby the excitation current is primarily supplied by the auxiliary winding and only the current deficit is provided by the secondary source.

DESCRIPTION OF THE DRAWINGS

These and other objects, features and advantages of the present invention will be better understood by reference to the detailed description taken in conjunction with the accompanying drawings in which.

DESCRIPTION OF THE PREFERRED EMBODIMENT

Figure 1:
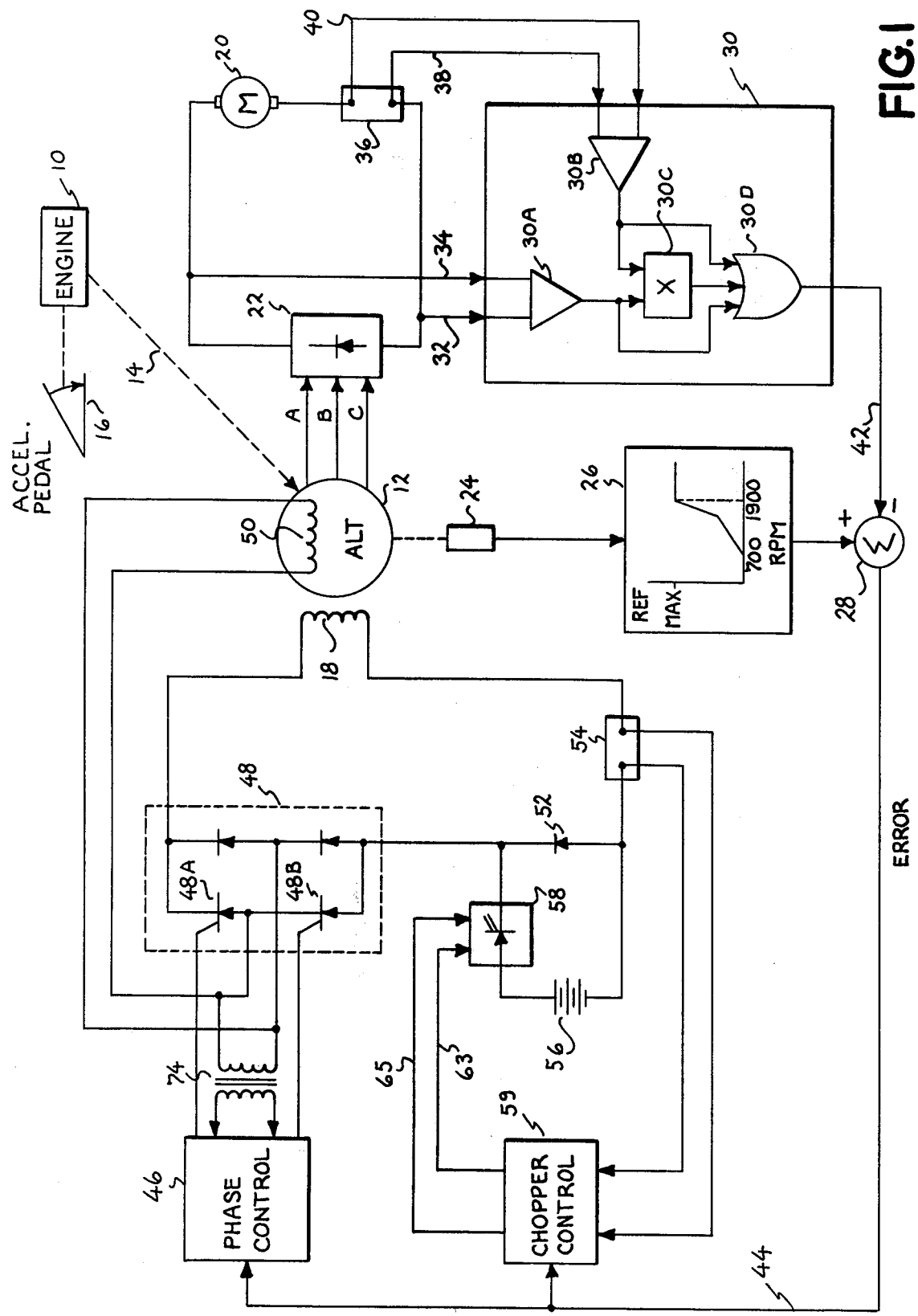
FIG. 1 is a simplified schematic of an electric vehicle propulsion system incorporating a self-excited alternator control system according to the present invention.

Referring now to FIG. 1, there is shown a simplified schematic diagram of a power control system for an electric traction vehicle according to the present invention. A prime mover 10 which may be, for example, an internal combustion engine such as a diesel engine, is adapted to drive an alternating current generator or alternator 12 through a connecting shaft 14. The rotational velocity or revolutions per minute (RPM) of shaft 14 is determined by the relative displacement of accelerator pedal 16 which is adapted to control the prime mover 10. Alternator 12 includes relatively rotatable first and second magnetic core members forming a magnetic circuit. A field winding 18 wound on one of the core members provides magnetizing flux for the magnetic circuit. A main winding (not shown) wound on the other of the core members provides alternating current output power. In the illustrated embodiment alternator 12 is a three phase machine providing three phase output on lines A, B, and C. For illustration purposes the output power developed on lines A, B, and C is shown as being supplied to a direct current motor 20 after being converted to direct current power by means of a bridge rectifier circuit 22. The motor 20 may be connected to drive a wheel-axle assembly (not shown) for propelling the traction vehicle.

The magnitude of power developed on lines A, B, and C by alternator 12 is determined by the relative rotational velocity of the first and second magnetic core members and by the level of excitation applied to the field winding 18. As is well known, the magnitude of the electrical power output developed by alternator 12 is determinative of the magnitude of the mechanical load reflected to the prime mover 10. For any given RPM of prime mover 10 there is a maximum level of loading which can be imposed without causing the prime mover 10 to bog or lose speed. Accordingly, the level of excitation applied to field winding 18 is preferably controlled as a function of the RPM of alternator 12. To acomplish this function, speed sensor 24 is operatively connected to alternator 12 for providing an output signal representative of the RPM of alternator 12. This output signal is supplied to a function generator 26 of a type well known in the art. The function generator 26 may be, for example, the type illustrated in section 11.23 of the Philbrick/Nexus *Application Manual for Operational Amplifiers*, second edition, 3rd printing in August, 1969 by Philbrick/Nexus Research of Dedham, Mass. As indicated by the graph illustrated in block 26, the function generator 26 produces an output signal or load reference signal as a predetermined function of the RPM signal from speed detector 24. In a preferred embodiment the output signal developed by function generator 26 is substantially zero at a minimum operating or idle RPM, for example, 700 RPM, and increases in a piecewise linear fashion to a maximum value at a maximum RPM reference level, for example, 1900 RPM. The signal developed by function generator 26 is applied to one input terminal of a summing junction 28.

Depending on the load characteristics, in this instance the load being represented by motor 20, the alternator 12 may be controlled as a function of its power output, its voltage output or its current output. For example, with very low or zero velocity of the motor 20, the current produced by alternator 12 may be relatively large while the voltage output is near zero. Under this condition, current should be the controlling or limiting parameter. In order to control alternator 12 as a function of voltage, current or power, there is provided a selection circuit 30 having a first set of input terminals connected to lines 32 and 34 for monitoring the voltage output of alternator 12. A second set of input terminals is connected to lines 38 and 40 for monitoring the current output of alternator 12. The current output signal is preferably developed by a current shunt 36 serially connected in the motor current path between motor 20 and rectifier circuit 22, although other well known means may be utilized.

The selection circuit 30 is shown as comprising a first differential amplifier 30A having input terminals connected to lines 32 and 34 for developing an output signal representative of the voltage produced by alternator 12. A second differential amplifier 30B has input terminals connected to lines 38 and 40 for developing an output signal representative of the current produced by alternator 12. The voltage representative signal and the current representative signal are supplied to an analog multiplier 30C which multiplies the two signals together to develop a signal representative of the electrical power being produced by alternator 12. The power signal is then applied to one input terminal of an analog OR circuit 30D. Two additional input terminals or OR circuit 30D are connected to receive the voltage signal and the current signal from amplifiers 30A and 30B, respectively. OR circuit 30D thus provides at its output terminal a signal representative of the magnitude of the largest of the power, voltage or current input signals. The signal developed by OR circuit 30D then becomes the actual measurement signal produced by selection circuit 30 for comparison with the reference signal from function generator 26. Although the circuit 30 is illustrated only in functional form, the construction of such a selection circuit including the necessary biasing resistors and gain or scaling adjustments are well known to those skilled in the art. Such circuits are shown, for example, in, and in the references cited in, U.S. Pat. No. 3,970,858 issued July 30, 1976 and assigned to the General Electric Co.

The signal from selection circuit 30 is representative of the mechanical load being reflected from alternator 12 onto the prime mover 10. This signal is applied via line 42 to a second input terminal of summing junction 28 where it is algebraically summed with the signal from function generator 26. Summing junction 28 thus provides an error signal representative of the difference between the actual power output being developed by alternator 12 and the power level represented by the load reference signal from function generator 26.

The error signal developed by summing junction 28 is supplied via line 44 to an input terminal of a thyristor or SCR phase control circuit 46. Phase control circuit 46 is connected to supply gating signals to a phase controlled rectifier circuit 48 which is connected in series circuit with the alternator field winding 18. Power for the phase controlled rectifier circuit 48 is supplied by an auxiliary or tertiary winding 50 which is wound on one of the magnetic members of the alternator 12. Preferably the auxiliary winding 50 is wound in conjunction with the main winding supplying the three phase output of the alternator in a manner as illustrated in the previously identified Canadian Pat. No. 812,936. The phase controlled rectifier circuit 48 has one output terminal connected to field winding 18 via a line 50 and a second output terminal connected to field winding 18 through a diode 52 and a current shunt 54. When the output current developed by auxiliary winding 50 is available to supply the excitation requirements of field winding 18, control of the thyristors 48a and 48b in phase control rectifier circuit 48 will allow the current from field winding 50 to be controllably supplied as excitation to field winding 18. As can be seen the current path between winding 18 and winding 50 is through the rectifier circuit 48, field winding 18, current shunt 54, and diode 52.

When the alternator is running at a very low RPM, the output current developed by auxiliary winding 50 may be insufficient to supply the desired amount of excitation for field winding 18. When this occurs, additional excitation may be supplied by a battery circuit 56 through a chopper circuit 58 of a type well known in the art such as that described in the *SCR Manual*, fifth edition, published in 1972 by the General Electric Co., Semiconductor Products Dept., Syracuse, N.Y. In the embodiment of FIG. 1 the battery circuit 56 and chopper circuit 58 are serially connected in parallel with the diode 52. If the excitation current available from field winding 50 is insufficient to satisfy the desired excitation level, chopper circuit 58 may be time ratio controlled to provide additional excitation current. Control of chopper circuit 58 is implemented by a chopper control circuit 59 in response to the error signal on line 44 and a current feedback signal from current shunt 54. In general the chopper circuit 58 will be gated into conduction for very large error signals on line 44; however, for currents in field winding 18 above a predetermined level the signal developed by current shunt 54 may be utilized to completely gate off the chopper circuit 58 since in that instance the power available from winding 50 will be sufficient to supply the requirements of field winding 18. A more detailed description of the operation of phase control circuit 46 and chopper control circuit 59 is illustrated in the accompanying FIG. 2. The battery circuit 56 of FIG. 1 may comprise a battery alone or, as is more common, may comprise a battery and associated battery charger. A typical battery charger will include a rotating machine such as a d-c generator or an alternator/rectifier unit and a voltage regulator. The charger is generally a low current unit connected to be directly driven by the prime mover 10. Since it is economically impractical to provide a battery circuit capable of supplying a relatively large amount of current for extended time periods, the phase control circuit 46 and chopper control circuit 59 are adapted to minimize the current drain on battery circuit 56.

Figure 2:
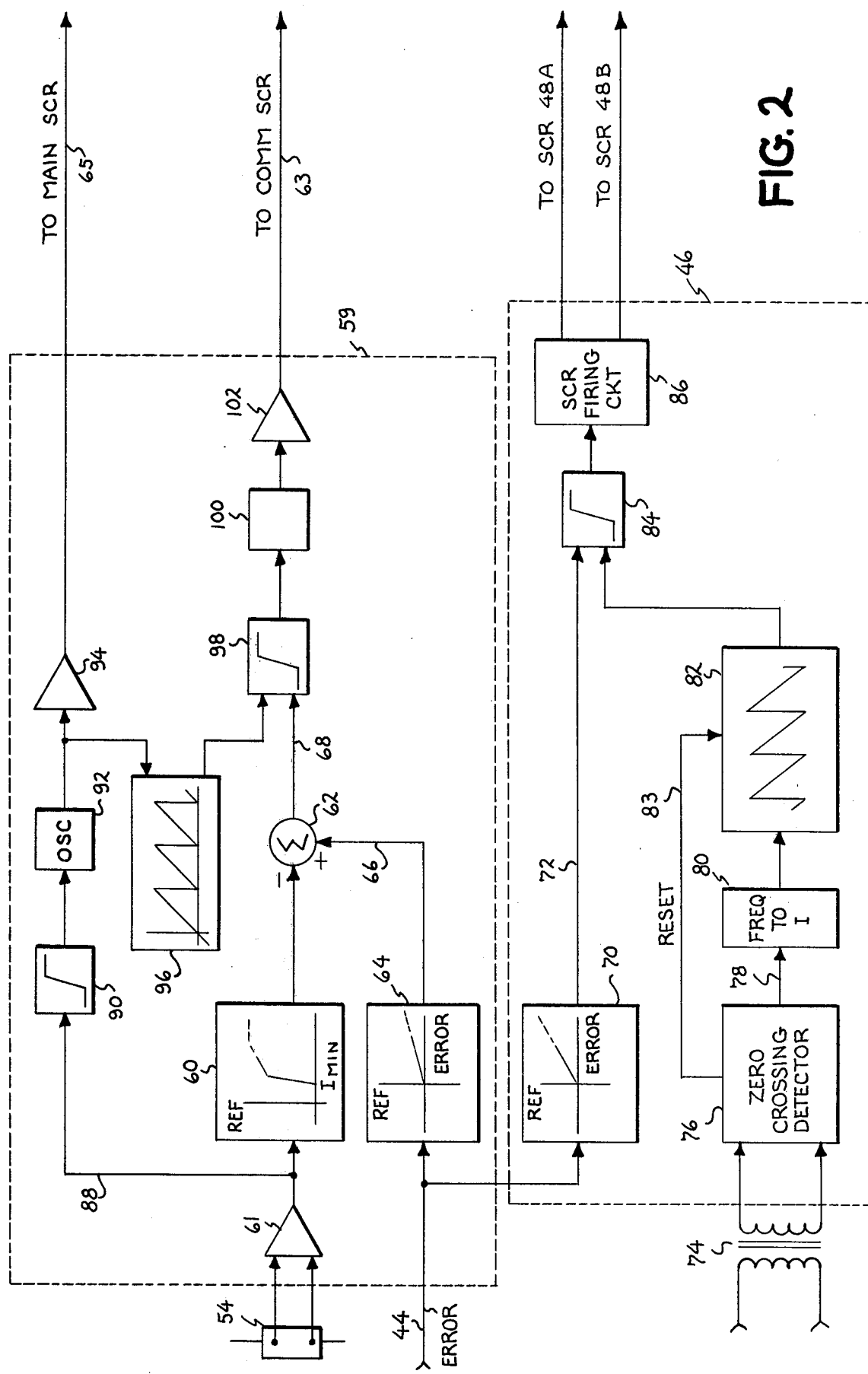
FIG. 2 is a block diagram of a regulating system according to the present invention for controlling the alternator of FIG. 1.

Referring now to FIG. 2 there is shown a preferred embodiment of the phase control circuit 46 and chopper control circuit 59. The current signal developed by currentshunt 54 is representative of the current in field winding 18 and is coupled to input terminals of a differential amplifier 61. The signal then developed by amplifier 61 is supplied to an amplifier 60 which is biased such that for a current in shunt 54 which is less than a predetermined level, for example 40 amperes, the output signal developed by amplifier 60 remains at substantially zero potential. When the current through shunt 54 attains the predetermined level, the signal level at the output terminal of amplifier 60 rises very rapidly to a maximum or saturation level which is thereafter maintained. The signal developed by amplifier 60 is applied to a first input terminal of a summing junction 62. A second input terminal of summing junction 62 is connected to receive an amplifier version of the error signal on line 44. This amplified error signal is provided by an amplifier 64, which has one input terminal connected to line 44 and an output terminal connected via line 66 to the second input terminal of summing junction 62. It will be appreciated that the output signal from summing junction 62 on line 68 is substantially equivalent to the output from amplifier 64 during the time period in which amplifier 60 produces a signal of substantially zero potential. However, as the signal developed by amplifier 60 increases, the signal on line 68 is very rapidly driven to a negative value. The output signal developed by amplifier 61 is applied via a line 88 to an input terminal of a switching amplifier 90 which may be, for example, a Schmitt trigger which changes state when the signal on line 88 exceeds a predetermined value. The output signal developed by amplifier 90 is applied to control an oscillator 92. Oscillator 92 is preferably a fixed frequency free running oscillator of a type well known in the art. The signal from amplifier 90 is used to turn off the oscillator when it goes to a high level, i.e., when the amplifier 90 changes state upon the current through shunt 54 reaching a predetermined value, oscillator 92 is turned off.

Oscillator 92 provides clock signals which are applied through an amplifier 94 to gate a main current carrying thyristor (not shown) in the chopper circuit 58 into conduction. Accordingly, at each clock pulse signal from oscillator 92, the main thyristor in chopper circuit 58 is triggered. The clock signals from oscillator 92 are also applied to a ramp function generator 96 causing the ramp function generator 96 to be reset in synchronism with the clock pulses from oscillator 92.

The ramp function signals from ramp function generator 96 are applied to a first input terminal of a comparator 98, a second input terminal of the comparator 98 being connected to line 68. When the ramp function signal from generator 96 reaches a magnitude greater than the magnitude of the error signal on line 68, comparator 98 changes state producing a positive going output signal. This signal is applied to trigger a one shot multivibrator 100 which then produces a pulse of a predetermined pulse width. This pulse is amplified by amplifier 102 and applied to chopper circuit 58 to commutate the main current carrying thyristor.

The error signal on line 44 is also applied to an input terminal of a second amplifier 70 which preferably has a higher gain than amplifier 64. Accordingly, the signal developed at the output of amplifier 70 on a line 72 will be a larger signal than that on line 66 at the same time. As will become apparent, the larger gain of amplifier 70 allows the circuit 46 to maximize the current supplied by auxiliary winding 50 and minimize the current supplied by battery circuit 56.

Alternating current is generated by alternator 12 on auxiliary winding 50. Since the frequency of this alternating current is proportional to the RPM of the prime mover 10, in order to properly control the rectifier circuit 48, it is necessary to provide control signals which are synchronous with the alternating voltage from winding 50. Synchronism of the control function is provided by tracking the voltage waveform in winding 50 by means of a voltage sensing transformer 74 having a primary winding connected in parallel with auxiliary winding 50 and a secondary winding connected to input terminals of a zero crossing detector 76. The zero crossing detector 76 provides an output pulse each time that the alternating current waveform crosses the zero voltage reference axis, i.e., at the beginning of each half-cycle of the alternating voltage waveform. The pulse signals developed by zero crossing detector 76 are applied via line 78 to a frequency-to-current converter 80 which converts the pulses to a d-c current proportional to the frequency of the pulses. The output signal from the frequency-to-current converter 80 is applied to a ramp generator circuit 82. The ramp generator circuit 82 may comprise, for example, a resettable integrating circuit. The ramp is reset at each zero crossing by pulses supplied by zero crossing detector 76 via line 83. Since the rate of rise of the ramp function is proportional to the d-c input current and since the ramp is reset at each zero crossing, the ramp rises to substantially the same amplitude during each half-cycle of the a-c voltage waveform and thus provides a synchronous control function. A detailed illustration and description of a zero-crossing detector, frequency-to-current converter and ramp generator circuit for developing a ramp function synchronized to a variable frequency a-c voltage waveform is given in co-pending application Ser. No. 812,215 of J. A. Laukaitis filed concurrently with this application and assigned to the General Electric Co.

The synchronized ramp function signal from ramp function generator 82 is applied to one input terminal of a comparator circuit 84, a second input terminal of comparator circuit 84 being connected to line 72 for receiving the amplified error signal. When the amplitude of the error signal on line 72 exceeds the amplitude of the ramp function signal, the comparator 84 will change state and provide an output signal to an SCR firing circuit 86. The SCR firing circuit 86 may be of a type well known in the art for providing firing pulses to phase controlled rectifier circuits. The design of such phase control firing circuits is described in Chapter 9 of the aforementioned GE *SCR Manual*. The SCR firing circuit 86 provides firing pulses to phase control the rectifiers 48a and 48b in a manner well known in the art.

To better understand the operation of the circuit in FIG. 2, consider the situation in which the alternator 12 is operating at relatively low RPM and is supplying power to the motor 20. The signal developed by selection circuit 30 on line 42 will be of lesser magnitude than the signal developed by function generator 26. Thus the error signal on line 44 supplied by summing junction 28 will be greater than zero. Since the alternator RPM is relatively low, the alternating current produced by auxiliary winding 50 will be insufficient to supply the required level of field current excitation. Accordingly, the battery circuit 56 will be called upon to supply current to field winding 18. Note, however, that the error signal on line 44 is amplified by amplifier 70 and provides on line 72 a relatively large signal. This large error signal on line 72 will cause comparator 84 to change state early in the period of each alternation of the current supplied by winding 50. The comparator 84 will thus supply signals to cause firing circuit 86 to phase the phase controlled rectifier circuit 48 into a full "on" condition to thereby take maximum available energy from field winding 50. Since this energy from field winding 50 is less than the desired level of excitation current for field winding 18, the error signal developed by amplifier 64 on line 66 will cause the comparator 98 to change state relatively late in the cycle of the ramp signals from ramp function generator 96 thus maintaining the chopper circuit 58 in a highly conductive mode, it being noted that the main thyristor in the chopper circuit is fired on each clock pulse from oscillator 92 and is commutated off by a change of state of comparator 98.

As alternator RPM is increased the current output of alternator 12 will reach a magnitude such that the excitation available from auxiliary winding 50 is sufficient to excite field winding 18 at the desired level. When the field excitation reaches this desired level, the error signal on line 44 becomes relatively small. The gain of amplifier 64 is set such that for a small error signal the amplifier output voltage is also relatively small. Thus, the signal on line 66 is of such a low magnitude that the chopper circuit 58 is commutated off almost as soon as it is gated into conduction. Of course, the transition to this state is relatively smooth and follows the rate of reduction of the magnitude of the error signal on line 44. Because of the higher gain of amplifier 70, however, the signal on line 72 remains of sufficient magnitude to control the operation of phase control rectifier circuit 48 in a manner to minimize the error signal on line 44.

Since the illustrated feedback control system is a non-integrating (type 0) regulating system, the error signal on line 44 always has a finite magnitude. Accordingly, the chopper circuit 58 is not completely inactivated by a minimum magnitude error signal. In order to assure complete inactivation of the chopper circuit 58, the switching amplifier 90 is set to change state when the current in shunt 54 reaches a predetermined magnitude, i.e., when the signal developed by amplifier 61 reaches a predetermined magnitude. A change of state by amplifier 90 inhibits the operation of oscillator 92 so that gating signals are no longer supplied to chopper circuit 58. Thus, once the field current excitation exceeds a predetermined magnitude, all the excitation is supplied by auxiliary winding 50 and regulated via phase control rectifier circuit 48.

Figure 3:
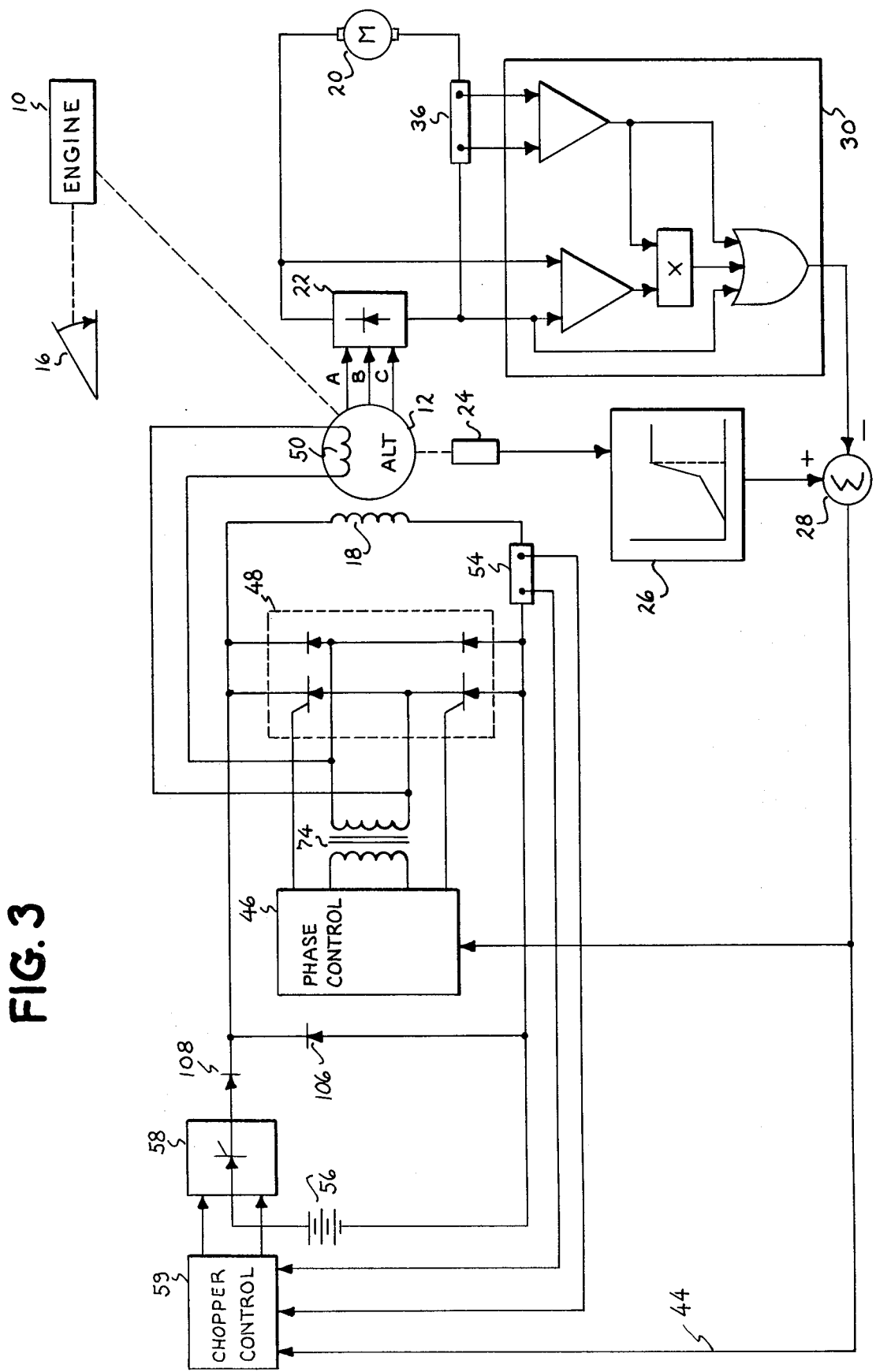
FIG. 3 is an alternate embodiment of the system of FIG. 1.

Referring now to FIG. 3 there is shown an alternate embodiment of the present invention in which the chopper circuit 58 and battery circuit 56 are connected in parallel circuit arrangement with the phase controlled rectifier circuit 48. A free-wheeling diode 106 is also connected in parallel with the rectifier circuit 48 and, as a consequence of the parallel connection of rectifier circuit 48 and field winding 18, is also connected in parallel with field winding 18. Diode 106 shunts the battery circuit 56 to prevent large inductive currents from damaging this circuit. The operation of the system of FIG. 3 is essentially identical to that of FIG. 1. However, the variable frequency firing of the phase control rectifier circuit 48 sometimes interacts with the chopper circuit 58 causing the latter to be gated at undesirable times. An additional diode 108 serially connected between chopper circuit 58 and rectifier circuit 48 aids in reducing this interaction.

As will be apparent the present invention provides an effective method and apparatus for operating a self-excited alternator under conditions in which the self-excitation current is insufficient for sustaining the operation of the alternator and for blending the required excitation current in a manner to maximize the contribution from the self-exciting source while minimizing the excitation from a secondary source.

Although the invention has been described in a preferred embodiment as being implemented using analog circuitry, there will be apparent to those skilled in the art other modifications and arrangements including implementation using digital techniques which come within the true spirit of the invention and thus it is contemplated that the scope of the invention be determined by the appended claims.

What we claim and desire to secure by Letters Patent of the United States is:

1. In a traction vehicle including electric traction motor means for propelling the vehicle, electrical generating means having main windings including a field winding for supplying electrical energy to said motor means, and thermal prime mover means for driving said generating means at a variable speed, an electrical propulsion control system adapted to regulate the electrical output of said generating means, said control system comprising:
   (a) an auxiliary winding wound on said generating means for providing additional electrical energy;
   (b) first means for interconnecting said auxiliary winding and said field winding, said first means including means for regulating the level of excitation supplied to said field winding from said auxiliary winding;
   (c) a controllable secondary source of direct current power;
   (d) second means for interconnecting said secondary source in circuit with said field winding for providing continuously controlled additional excitation when the available electrical energy from said auxiliary winding is less than a predetermined magnitude; and
   (e) control means for controlling said first and second means such that the excitation supplied to said field winding comprises a first component supplied from said auxiliary winding and a second component supplied from said secondary source, said second component having an average magnitude substantially equal to the difference between the desired magnitude of field excitation and the maximum average magnitude of excitation available from said auxiliary winding.

2. The control system of claim 1 wherein said control means comprises:
   (a) means for providing feedback signals which vary as functions of voltage and current levels of the electrical output supplied by said generating means to said motor means;
   (b) means for providing a reference signal which varies as a predetermined function of the rotational velocity of the rotor of said generating means;
   (c) comparison means responsive to said feedback and reference signals for providing an error signal representative of the difference between the magnitude of said reference signal and the magnitude of the largest of said feedback signals;
   (d) first amplifying means connected for amplifying said error signal to produce a signal for controlling the magnitude of field excitation supplied by said secondary source; and
   (e) second amplifying means connected for amplifying said error signal to produce a signal for controlling the magnitude of field excitation supplied by said auxiliary winding, the amplification factor of said first amplifying means being less than the amplification factor of said second amplifying means.

3. The system of claim 2 wherein said first means comprises a phase controlled rectifier circuit having at least two thyristors and including first and second input terminals connected to said auxiliary winding and first and second output terminals connected to said field winding, gating terminals of said thyristors being connected to a thyristor firing circuit responsive to said amplified error signal for controlling the conduction phase retard of said thyristors.

4. The system of claim 3 wherein said secondary source comprises:
   (a) a d-c power source; and
   (b) a chopper circuit connecting in series circuit arrangement with said d-c power source.

5. The system of claim 4 and including diode means interconnecting one output terminal of said rectifier circuit and one terminal of said field winding, said series combination of said d-c power source and said chopper circuit being connected in parallel circuit arrangement with said diode means.

6. The system of claim 5 and including:
   (a) current sensing means for providing a current signal representative of the desired magnitude of current in said field winding; and
   (b) means responsive to said current signal for smoothly blending control from said chopper circuit to said phase controlled rectifier circuit such that utilization of self excitation energy from said auxiliary winding is maximized and utilization of energy from said secondary source is minimized.

7. The system of claim 4 and including means for interconnecting the series combination of said chopper circuit and said d-c power source in parallel circuit arrangement with said phase controlled rectifier circuit.

8. The system of claim 7 wherein said interconnecting means comprises at least one diode means poled to conduct current from said d-c power source to said field winding.

9. The system of claim 8 and including free-wheeling diode means connected in parallel circuit arrangement with said field winding.

* * * * *